United States Patent
Irish et al.

(10) Patent No.: US 7,716,423 B2
(45) Date of Patent: May 11, 2010

(54) PSEUDO LRU ALGORITHM FOR HINT-LOCKING DURING SOFTWARE AND HARDWARE ADDRESS TRANSLATION CACHE MISS HANDLING MODES

(75) Inventors: John D. Irish, Rochester, MN (US); Chad B. McBride, Rochester, MN (US); Andrew H. Wottreng, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 11/348,971

(22) Filed: Feb. 7, 2006

(65) Prior Publication Data

US 2007/0186046 A1 Aug. 9, 2007

(51) Int. Cl.
*G06F 12/00* (2006.01)
*G06F 13/28* (2006.01)
*G06F 13/00* (2006.01)

(52) U.S. Cl. .................. 711/133; 711/154; 711/206; 711/221

(58) Field of Classification Search ............... 711/133
See application file for complete search history.

(56) References Cited

U.S. PATENT DOCUMENTS

| | | | |
|---|---|---|---|
| 2002/0069327 A1* | 6/2002 | Chauvel | 711/130 |
| 2002/0073282 A1* | 6/2002 | Chauvel et al. | 711/122 |
| 2007/0079073 A1* | 4/2007 | Rosenbluth et al. | 711/134 |
| 2007/0143565 A1* | 6/2007 | Corrigan et al. | 711/202 |
| 2007/0283121 A1* | 12/2007 | Irish et al. | 711/202 |

\* cited by examiner

*Primary Examiner*—Brian R Peugh
*Assistant Examiner*—Prasith Thammavong
(74) *Attorney, Agent, or Firm*—Patterson & Sheridan, LLP

(57) ABSTRACT

The present invention provides an improved way to calculate a replacement way within a processor cache that is effective with different combinations of hardware address translation cache miss handling, software address translation cache miss handling, and hint lock bits. For some embodiments, LRU bits used to select an entry for replacement are updated only if software address translation cache miss handling is disabled. Further, for some embodiments, LRU bits may be modified to change the way a binary tree structure is traversed to avoid selecting a hint locked entry for replacement.

10 Claims, 9 Drawing Sheets

| HIT WAY | CALCULATE LRU | BINARY TREE | NEW LRU WAY |
|---|---|---|---|
| 310 | | tree: root 0, children 0, 0; leaves 0,1,2,3 | |
| 312 HIT ON WAY 2. | 0 0 0  LRU<br>0 0 1  SET<br>1 0 1  MASK<br>0 0 1  NEW LRU | tree: root 0, children 0, 1; leaves 0,1,2,3 | NEW LRU=WAY 0 |
| 314 HIT ON WAY 1. | 0 0 1  LRU<br>1 0 0  SET<br>1 1 0  MASK<br>1 0 1  NEW LRU | tree: root 1, children 0, 1; leaves 0,1,2,3 | NEW LRU=WAY 3 |
| 316 HIT ON WAY 3. | 1 0 1  LRU<br>0 0 0  SET<br>1 0 1  MASK<br>0 0 0  NEW LRU | tree: root 0, children 0, 0; leaves 0,1,2,3 | NEW LRU=WAY 0 |
| 318 HIT ON WAY 0. | 0 0 0  LRU<br>1 1 0  SET<br>1 1 0  MASK<br>1 1 0  NEW LRU | tree: root 1, children 1, 0; leaves 0,1,2,3 | NEW LRU=WAY 2 |
| 320 HIT ON WAY 2 | 1 1 0  LRU<br>0 0 1  SET<br>1 0 1  MASK<br>0 1 1  NEW LRU | tree: root 0, children 1, 1; leaves 0,1,2,3 | NEW LRU=WAY 1 |

FIG. 3A

| | HIT WAY | CALCULATE LRU (332) | BINARY TREE (334) | NEW LRU WAY |
|---|---|---|---|---|
| 338 | | | 0 → 0, 0 → 0,1,2,3 Locked Way (2) | |
| 340 | HIT ON WAY 2. | 0 0 0  LRU<br>* No Change  SET<br>No Change  MASK<br>―――――――<br>0 0 0  NEW LRU<br>*No LRU Update b/c hit on locked way | Tree with 0s, locked way 2 | NEW LRU = OLD LRU = WAY 0 |
| 342 | HIT ON WAY 1. | 0 0 0  LRU<br>1 0 0  SET<br>1 1 0  MASK<br>―――――――<br>1 0 0  NEW LRU<br>*1 0 1  Non-Locked LRU | Tree: root 1, left 0, right 1* | NEW LRU = 100<br>* However, due to new LRU way being locked, non-locked LRU way = 101 = Way 3 |
| 344 | HIT ON WAY 3. | 1 0 1  LRU<br>0 0 0  SET<br>1 0 1  MASK<br>―――――――<br>0 0 0  NEW LRU | Tree: root 0, 0, 0 | NEW LRU = 000 = WAY 0 |
| 346 | HIT ON WAY 0. | 0 0 0  LRU<br>1 1 0  SET<br>1 1 0  MASK<br>―――――――<br>1 1 0  NEW LRU<br>*1 1 1  Non-Locked LRU | Tree: root 1, left 1, right 1* | NEW LRU = 110<br>* However, due to new LRU way being locked, non-locked LRU way = 111 = Way 3 |
| 348 | HIT ON WAY 2 | 1 1 1  LRU<br>No Change  SET<br>No Change  MASK<br>―――――――<br>1 1 1  NEW LRU<br>*No LRU Update b/c hit on locked way | Tree: root 1, 1, 1 | NEW LRU = OLD LRU = WAY 3 |

FIG. 3B

| HIT WAY | CALCULATE LRU | BINARY TREE | NEW LRU WAY |
|---|---|---|---|
| 368 | | (tree with 0 at root, 0/0 children, leaves 0,1,2,3 with 2,3 locked) — Locked Way | |
| 370 HIT ON WAY 2. | 0 0 0    LRU<br>0 0 1    SET<br>1 0 1    MASK<br>0 0 1    NEW LRU | (tree 0/0/1, leaves 0,1,2,3) | NEW LRU = 001<br>= WAY 0 |
| 372 HIT ON WAY 1. | 0 0 1    LRU<br>1 0 0    SET<br>1 1 0    MASK<br>1 0 1    NEW LRU<br>* 0 0 1    Non - Locked LRU | [1]* 0, 0/1, leaves 0,1,2,3 | NEW LRU = 101<br>= WAY 3<br>* However, due to new LRU way being locked, non-locked LRU way = 001 = Way 0 |
| 374 HIT ON WAY 3. | 0 0 1    LRU<br>0 0 0    SET<br>1 0 1    MASK<br>0 0 0    NEW LRU | (tree 0/0/0, leaves 0,1,2,3) | NEW LRU = 000<br>= WAY 0 |
| 378 HIT ON WAY 0. | 0 0 0    LRU<br>1 1 0    SET<br>1 1 0    MASK<br>1 1 0    NEW LRU<br>* 0 1 0    Non - Locked LRU | [1]* 0, 1/0, leaves 0,1,2,3 | NEW LRU = 110<br>= WAY 2<br>* However, due to new LRU way being locked, non-locked LRU way = 010 = Way 1 |
| 380 HIT ON WAY 2 | 0 1 0    LRU<br>0 0 1    SET<br>1 0 1    MASK<br>0 1 1    NEW LRU | (tree 0, 1/1, leaves 0,1,2,3) | NEW LRU = 011<br>= WAY 1 |

FIG. 3C

PSEUDO LRU ALGORITHM FOR HINT-LOCKING DURING SOFTWARE AND HARDWARE ADDRESS TRANSLATION CACHE MISS HANDLING MODES

BACKGROUND OF THE INVENTION

1. Field of the Invention

The present invention generally relates to address translation caching and, more particularly, to determining cache entries for replacement.

2. Description of the Related Art

Computing systems often include central processing units (CPUs) to perform operations relating to the processing of data. The data processed by a processor may include instructions, which are executed by the processor, as well as data which is manipulated by the processor using the instructions. Computing systems also include memory used to store data and instructions for later use.

To provide for faster access to data and instructions, as well as better utilization of the CPU, the CPU may have several caches. A cache is a memory which is typically smaller than the main memory of the computer system and is typically manufactured on the same die (i.e., chip) as the processor. Cache memory typically stores duplications of data from frequently used main memory locations. Caches may also store virtual memory translation information such as segment tables and page tables. These tables aid in the translation of virtual memory addresses to the corresponding physical memory address. When a processor wishes to read from a memory location in main memory, the processor will check the memory cache first to see if a duplication of the main memory location is present in the cache. If so, the processor uses the data in the cache. If the data is present in the cache it is commonly referred to as a "cache hit". If the data is not present in the cache, then the data must be fetched from main memory. This is commonly referred to as a "cache miss".

Due to the limited size of cache memory within the processor, data within the cache that has not been used in a relatively long time is replaced with the data fetched from main memory due to a cache miss. This is based on the theory that it is more likely that the fetched data will be requested sooner than the data replaced.

Some CPUs use hardware logic to determine what data within the memory cache is to be replaced. This is commonly referred to as hardware miss handling. Hardware miss handling often uses a combination of a least recently used (LRU) table and lock bits associated with the cache entries to determine which data location or locations to replace with data fetched from main memory.

An LRU table contains information relating to how often different cache entries have been used. More specifically the table may be able to determine which entries are the least recently used entries. The lock bits are bits on each cache entry within the cache that may be set to indicate that the cache entry should not be replaced with data fetched from main memory.

Some CPUs allow software to determine how a miss is handled for address translation. When a miss occurs when software address translation cache miss handing is enabled on the CPU, a cache miss causes an exception. The exception results in an interrupt so that software executing on the CPU can fetch the missing memory and determine where in the address translation cache the data fetched from memory needs to be placed. Software address translation cache miss handling does not use the hardware LRU table to determine where to place fetched data into the cache.

Problems arise in modern CPUs when both hardware and software address translation cache miss handling are enabled at the same time. One problem is which entries to replace when both hardware and software address translation cache miss handling are enabled, and there are locked entries within the cache. For example, if hardware miss handling were enabled and all entries had their lock bits asserted, the hardware would still be able to replace the entity. However, if software address translation cache miss handling was enabled as well, and all entries had their lock bits asserted, the hardware would not replace a cache line entry. Rather, hardware would cause an exception. Another problem is how to update the LRU table when hits occur under software address translation cache miss handling.

Therefore, there exists a need for an improved way to calculate the replacement way within a memory cache that is effective with different combinations of hardware miss handling, software address translation cache miss handling, and lock bits.

SUMMARY OF THE INVENTION

Embodiments of the present invention generally provide methods and apparatus for updating LRU table entries and replacing address translation cache entries.

One embodiment provides a method of updating entries in a table used to indicate recent use of entries in an address translation cache in order to guide replacement. The method generally includes detecting that a request for address translation hits in the address translation cache, determines if the request for address translation hit on a hint locked entry of the address translation cache, and updates an entry in the table only if the request for address translation hit on an entry that is not hint locked or software address translation cache miss handling is disabled.

Another embodiment provides a method of selecting an address translation cache entry for replacement. The method generally includes fetching data in response to an address translation request that misses in the address translation cache, retrieving an entry from a table, generating a selection value by modifying the retrieved entry based on corresponding hint lock bits, and using the generated selection value to select a way in the cache for replacement with the fetched data.

Another embodiment provides a processor generally including an address translation cache, a table holding entries indicating the recent use of entries in the address translation cache, and logic. The logic is configured to detect that a request for address translation hits in the address translation cache, determine if the request for address translation hit on a hint locked entry of the address translation cache, and update entries in the table only if the address translation cache hits on an entry that is not hint locked or software address translation cache miss handling is disabled.

Another embodiment provides a processor generally including an address translation cache, a table holding entries indicating the recent use of entries in the address translation cache, and logic. The logic is generally configured to retrieve an entry from a table indicating recent use of entries in the cache, determine if the table entry would result in selection of a hint locked entry in the cache using a selection algorithm, and if so, modify one or more bits of the table entry in order to select a non-hint locked cache entry using the selection algorithm.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 3A-C illustrate exemplary techniques for identifying an entry for replacement based on binary tree structures, according to one embodiment of the invention.

DETAILED DESCRIPTION OF THE PREFERRED EMBODIMENTS

Figure 1A:
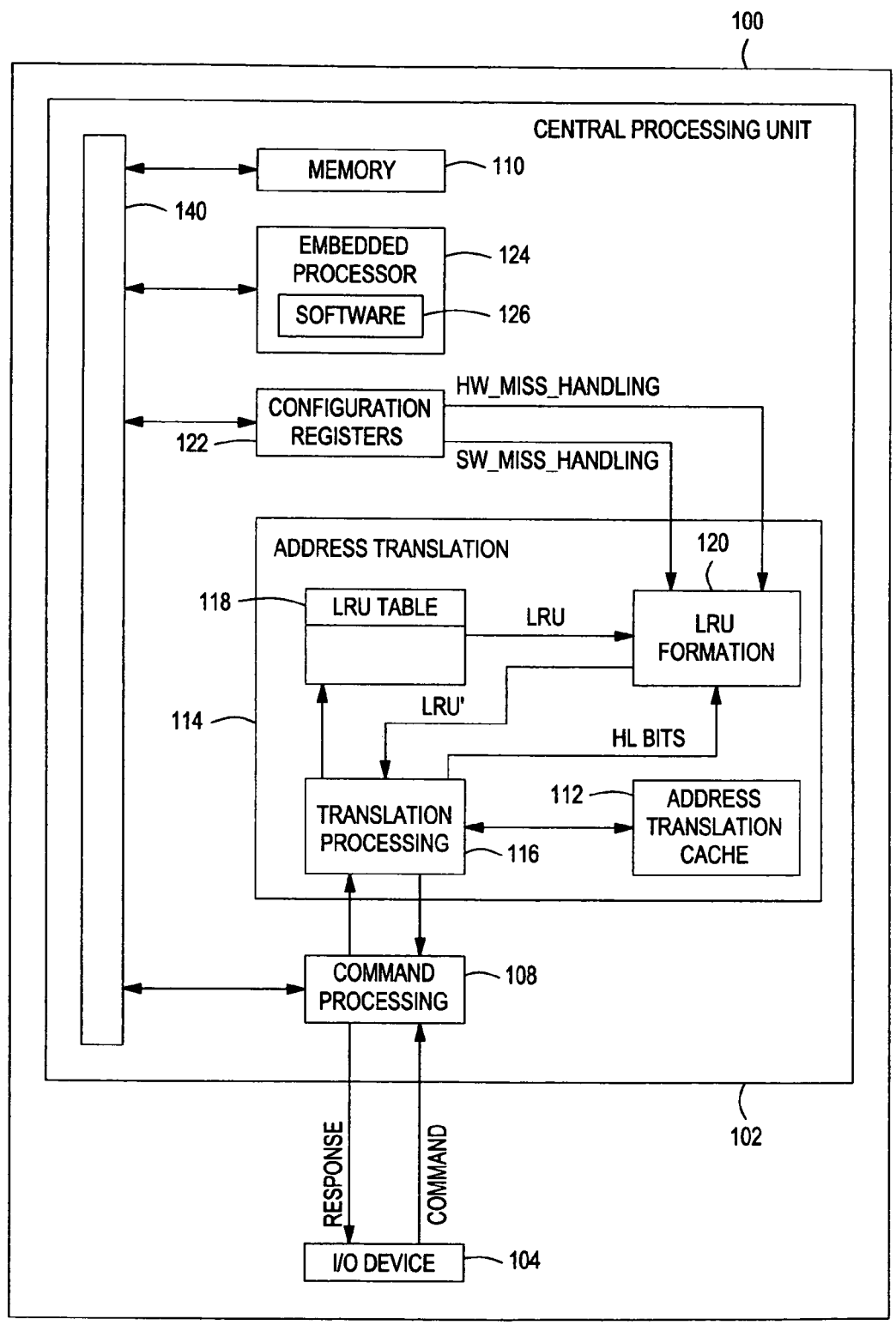
FIGS. 1A-B are block diagrams illustrating a computing environment and an address translation cache, according to one embodiment of the invention.

The present invention provides an improved way to calculate a replacement way within a processor cache that is effective with different combinations of hardware address translation cache miss handling, software address translation cache miss handling, and hint lock bits. For some embodiments, LRU bits used to select an entry for replacement are updated only if software address translation cache miss handling is disabled. Further, for some embodiments, LRU bits may be modified to change the way a binary tree structure is traversed to avoid selecting a hint locked entry for replacement.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

An Exemplary System

FIG. 1 is a block diagram illustrating a central processing unit (CPU) 102 coupled to an I/O device 104, according to one embodiment of the invention. In one embodiment, the CPU 102 may reside within a computer system 100 such as a personal computer or gaming system. The I/O device 104 may also reside within the same computer system. In a modern computing system there may be a plurality of I/O devices 104 attached to the CPU 102. For example, an I/O device 104 may consist of random access memory (RAM), a video card, or a hard drive. The I/O device 104 may be physically attached to the CPU 102 inside of the computing system by means of a bus.

An I/O device 104 will send commands to the CPU for execution. The CPU may respond to the I/O device 104 with a result. In one embodiment, a command processing system 108 may reside within the CPU 102. Within the command processing system commands sent from I/O devices 104 are stored and prepared for execution by the CPU 102.

A CPU 102 may also contain address translation logic 114 to aid in the translation of virtual memory addresses to physical memory addresses. The address translation logic 114 may be composed of translation processing logic 116, least recently used (LRU) formation logic 120, an address translation cache 112, and an LRU table 118. An address translation cache 112 may contain a segment table cache and a page table cache for temporarily storing frequently used data from main memory. A LRU table 118 may be used to determine which entries within the address translation cache 112 should be replaced after a cache miss occurs and a new entry is fetched. The address translation logic 114 may perform operations related to using and updating the LRU table 118 as further described in FIG. 2.

The CPU 102 may also contain configuration registers 122 for configuring operation of components of the CPU 102, for example, allowing software and/or hardware address translation cache miss handling to be enabled and disabled. Furthermore, the CPU 102 may contain an embedded processor 124 for executing commands ready for processing, memory 110, and an on-chip data bus 130. The embedded processor 124 may be executing software 126.

Figure 1B:
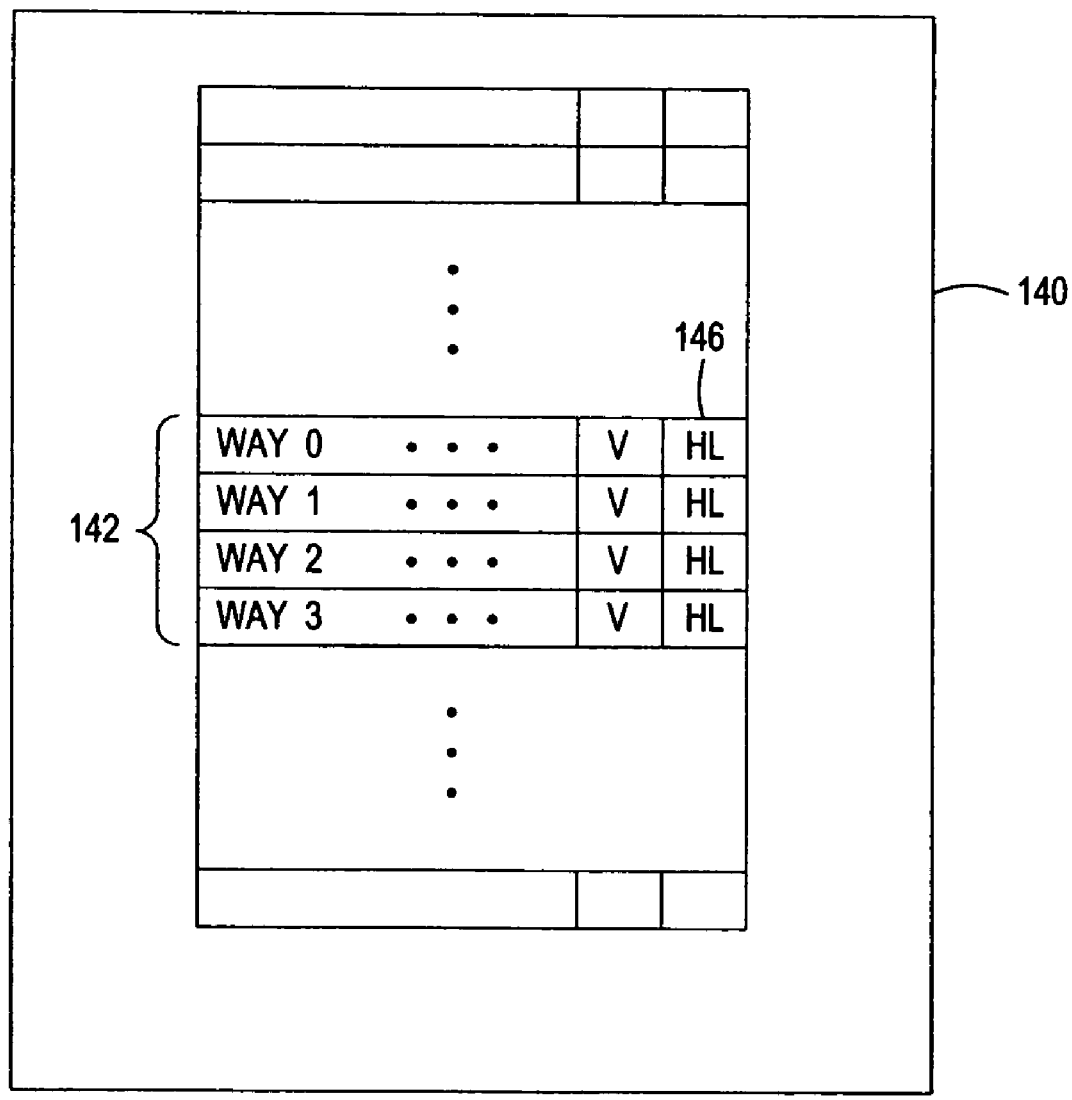

FIG. 1B is an exemplary block diagram illustrating an address translation cache 140, according to one embodiment of the invention. FIG. 1B may be one embodiment of an address translation cache 112 as illustrated in FIG. 1A. FIG. 1B illustrates a 4-way set associative address translation cache 140. A 4-way set associative address translation cache 140 means that each set or congruence class 142 may contain 4 locations, or ways, where data retrieved from a main memory location may be placed into the address translation cache 140. Where a hit occurred within the congruence class may be referred to as a hit way.

Each entry within the address translation cache 112 may contain a hint lock bit 146. The hint lock bit 146 may be set by hardware to indicate that the entry within the address translation cache should not be replaced. If hardware address translation cache miss handling is enabled by itself, the hint lock bit acts merely as a hint, and is not a hard lock. For example, if hardware address translation cache miss handling is enabled and all 4 entries are hint locked, hardware may still replace an entry within the congruence class by referring to the LRU. However, if software address translation cache miss handling is enabled as well and all 4 entries are hint locked, hardware may cause an exception, according to one embodiment of the invention.

Exemplary Operations

Figure 2A:
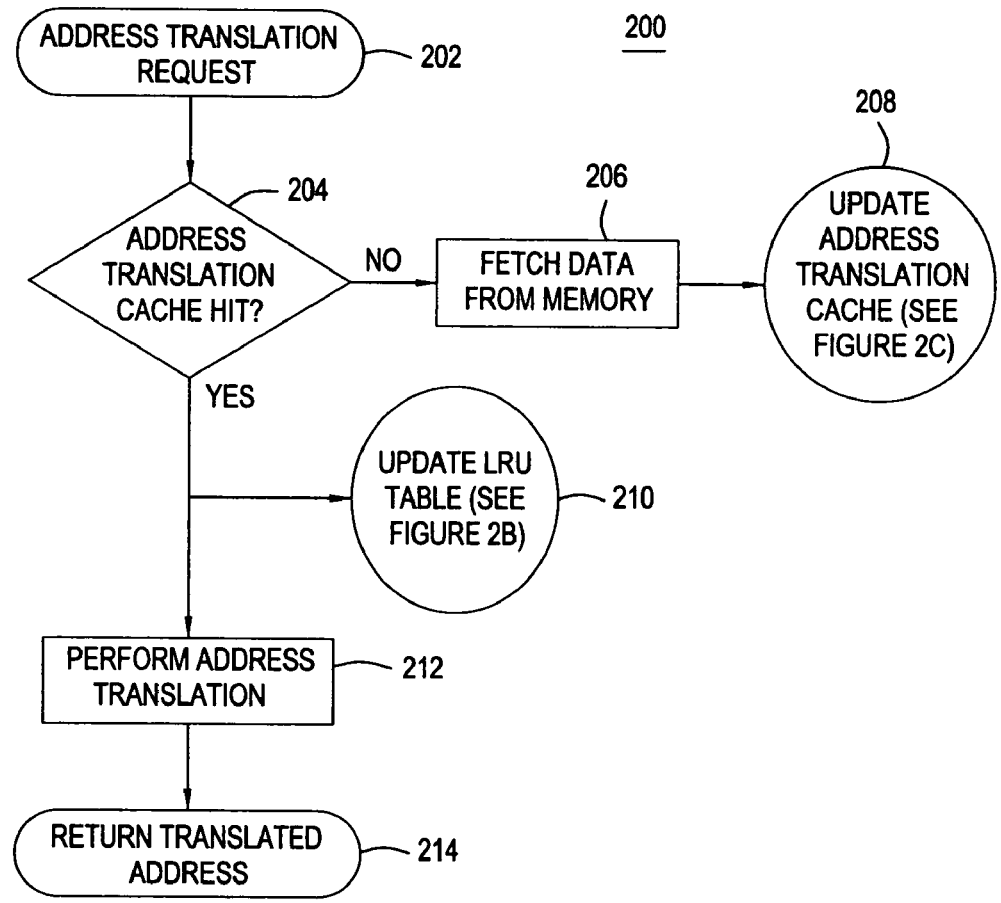
FIGS. 2A-C are flowcharts illustrating operations relating to performing address translation, updating a least recently used table, and picking a memory address cache replacement way, according to one embodiment of the invention.

FIG. 2A is a flowchart illustrating a method 200 of performing address translation, according to one embodiment of the invention. The operations 200 described in FIG. 2A may be performed by the address translation logic 114 as described in FIG. 1.

The address translation logic 114 may begin the operation 200 when a request for address translation is received from command processing 108 at step 202. At step 204, the address translation logic 114 may perform operations to determine if the virtual address provided by the command processing logic 108 matches any addresses contained in address translation cache 112. If so, the address translation logic 114 may proceed to step 212 to perform address translation, and may also perform operations for calculating a new LRU value and updating the LRU table at step 210. Operations relating to calculating a new LRU value and updating the LRU table are explained further with reference to FIG. 2B. After the address translation logic 114 has performed address translation at step 212, the address translation logic 114 may return the translated address to the command processing logic 108 at step 214.

If no address within the address translation cache 112 matches the virtual address provided by the command processing logic 108 (i.e., a cache miss) the address translation logic 114 may, at step 206, fetch the data necessary from main memory to populate the address translation cache 112 with the requested data. At step 208, the address translation logic 114 may perform operations to update the address translation cache 112 including replacing an existing entry with an entry fetched in response to a miss. These operations are described in more detail below with reference to FIG. 2C.

As shown in the operations described below, in some embodiments LRU table entries may be updated only on address translation cache hits.

Updating LRU Table Entries

Figure 2B:
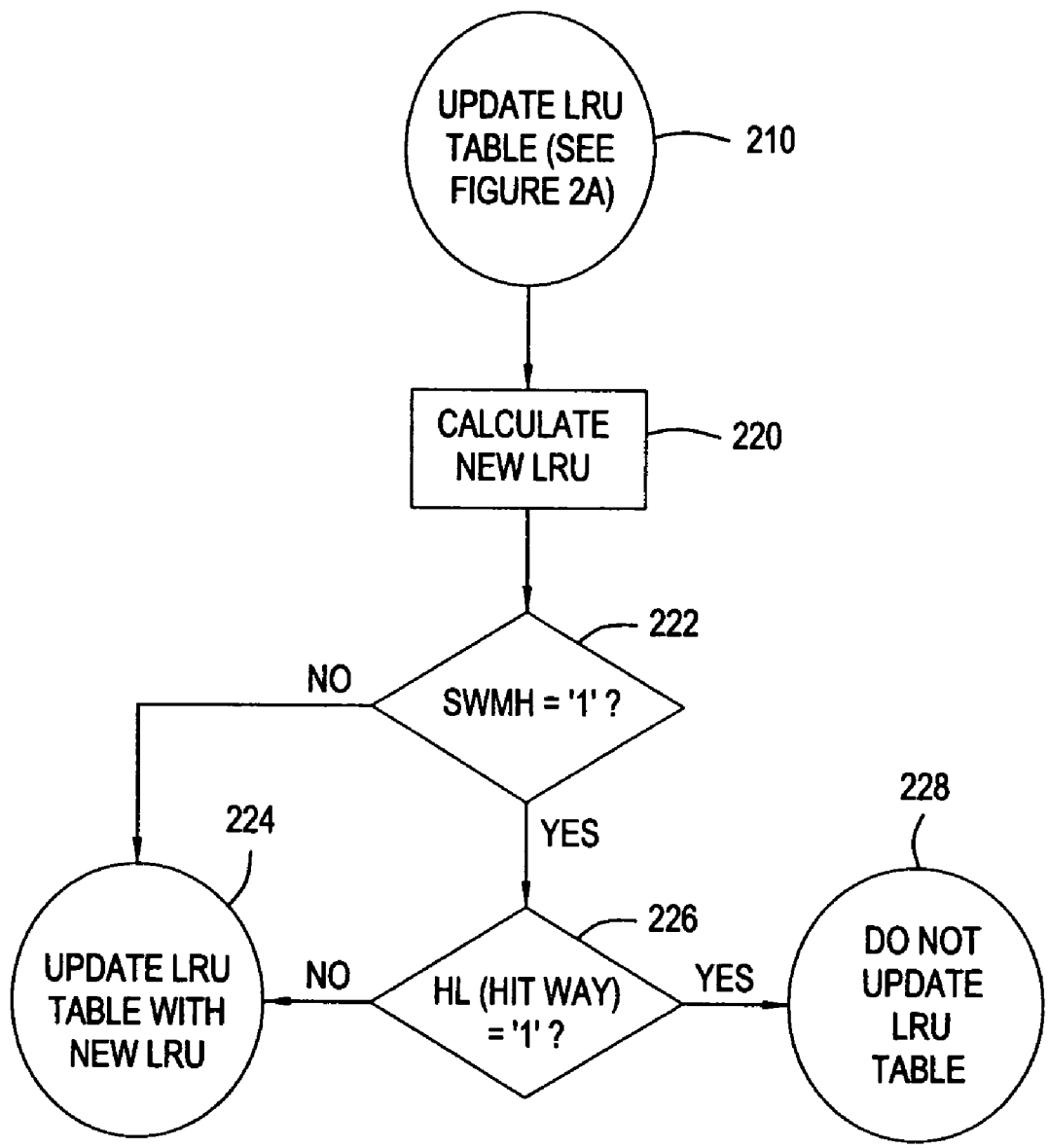

FIG. 2B illustrates operations relating to the calculation of a new LRU value and updating the LRU table 118, according to one embodiment of the invention. The operations may be commenced, at step 218, after there has been an address translation cache hit as is depicted in FIG. 2A. At step 220 the LRU formation logic 120 may calculate a new LRU value. Operations relating to calculating the new LRU value are described in further detail below with reference to FIGS. 3A-C.

At step 222, the address translation logic 114 performs operations to determine if software address translation cache miss handling is enabled (e.g., by checking a bit in a configuration register). In one embodiment of the invention, if software address translation cache miss handling is enabled the address translation logic 114 proceeds to step 226 where the address translation logic 114 determines if the hint lock bit is set on the address translation cache 112 entry which was just used to get the address translation information (i.e., the hint lock bit on the "hit way"). The hint lock bit may be enabled, or set, on the hit way by software to indicate that the software does not want that particular cache entry to be replaced.

In one embodiment the hint lock bit may be set by software. Software may write data to the cache entry to set the hint lock bit. In yet another embodiment, software may set the hint lock bit after an address translation cache miss by having hardware load an address translation cache entry that sets the hint lock bit.

According to one embodiment of the invention, if the hint lock bit is set for the cache way which was a hit due to the address translation request 202, and software address translation cache miss handling was enabled then the LRU formation logic 120 may not calculate a new LRU and the LRU table 118 may not be updated (228). The decision not to calculate a new LRU or update the LRU table 118 in this situation may lead to more cache hits in the future because only hardware address translation cache miss handling may update the LRU table 118 on cache hits. Only hardware address translation cache miss handling uses the LRU table when determining which entries to replace in the cache, so only updating the LRU table only when a hit occurred due to hardware address translation cache miss handling calculations may make the LRU more accurate.

Returning to step 226. If the address translation logic 114 determines that software address translation cache miss handling is not enabled then the LRU formation logic 120 may update the LRU table 118 at step 224. Calculation of a new LRU is described below with reference to FIGS. 3A-3C.

Selecting LRU Entries for Replacement

Figure 2C:
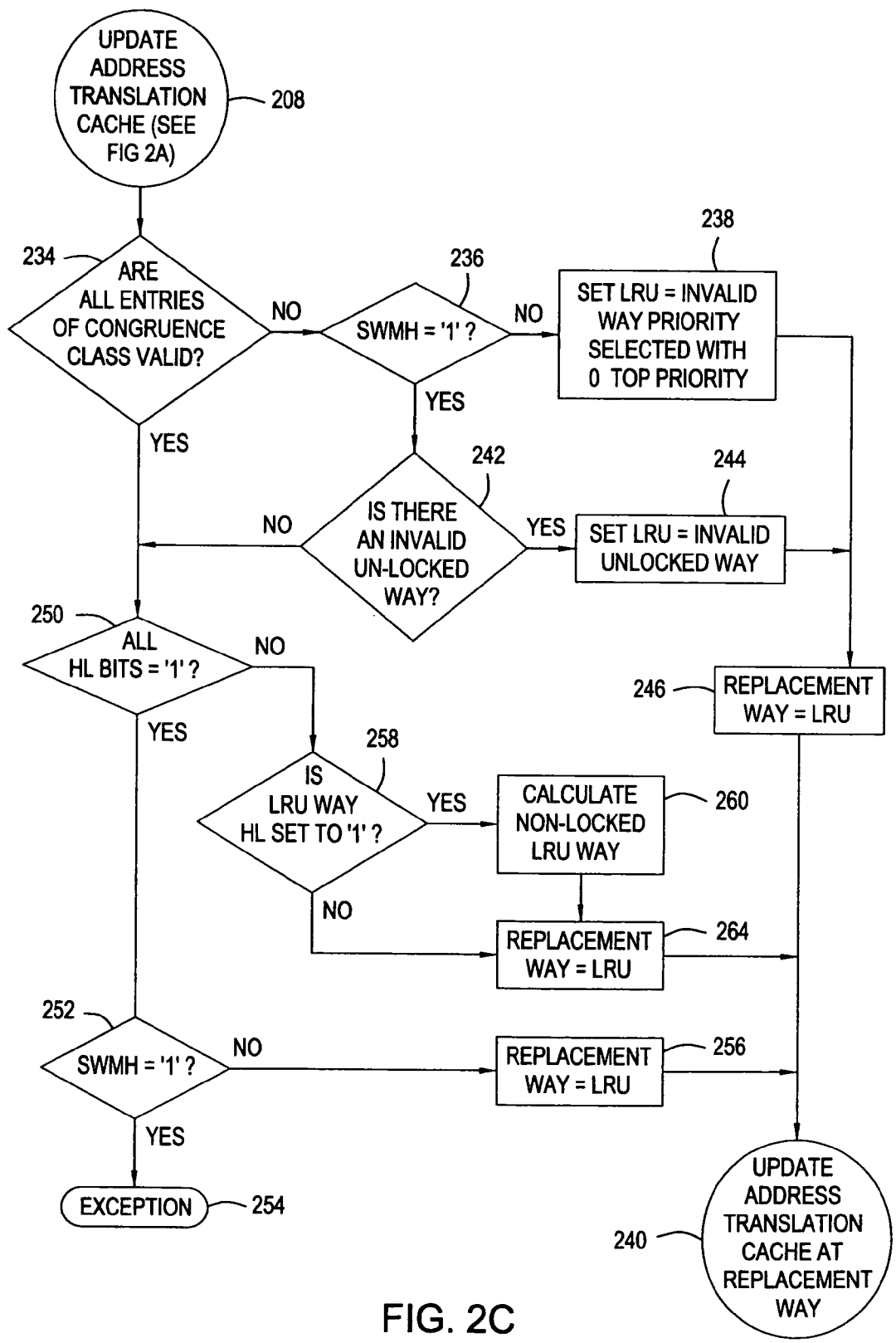

FIG. 2C illustrates operations for updating the LRU table and the address translation cache 112 with data fetched from main memory, according to one embodiment of the invention. The operations may be commenced when step 208 in FIG. 2A is reached. At step 234, the address translation logic 114 may perform operations to determine if all of the entries in the congruence class within the address translation cache 112 are valid. The validity of a cache entry may be determined by checking the valid bit. An invalid entry may be one that cannot be used for address translation and thus is eligible for replacement with data that was fetched from main memory.

If the address translation cache 112 is a 4-way-set associative cache, then all 4 ways within the appropriate congruence class may be checked to determine if all of the entries are valid. According to one embodiment of the invention, if any of the entries are invalid, then the address translation logic 114 may proceed to step 236 where the address translation logic 114 may determine if software address translation cache miss handling is enabled. If not, at step 238 the address translation logic 114 may set the LRU to be the invalid way within the congruence class.

According to one embodiment of the invention, if there are multiple invalid entries within the congruence class then the address translation logic 114 may select the invalid way that is closest to the start of the set (i.e., closest to way 0). After the address translation logic 114 has set the LRU to an invalid way, at step 246 the address translation logic 114 may set the replacement way to the LRU way. Once the replacement way has been set, the address translation logic 114 proceeds to step 240 where the address translation logic 114 may update the address translation cache 112 with the fetched data in the replacement way.

Returning to step 236, in one embodiment of the invention, if the address translation logic 114 determines that software address translation cache miss handling is enabled, the address translation logic 114 may perform operations, at step 242, to determine if there is an invalid non-hint locked way within the congruence class. If there is an invalid non-hint locked way, the address translation logic 114 may set the LRU to the invalid non-hint locked way, at step 244. The replacement way will then be set to the LRU way, at step 246. Next, at step 240, the address translation logic 114 may update the address translation cache 112 with the fetched data in the replacement way.

Returning to step 234, in one embodiment of the invention, if the address translation logic 114 determines that all entries of the congruence class are valid, the address translation logic 114 may proceed to step 250 where it may perform operations to determine if all of the hint lock bits within the congruence class are set. If so, then the address translation logic 114 may proceed to step 252 and perform operations to determine if software address translation cache miss handling is enabled. If software address translation cache miss handling is enabled, the address translation logic 114 may send/cause an exception at step 254. However, if software address translation cache miss handing is not enabled, the address translation logic 114 may proceed to step 256 where the replacement way may be set to the LRU way, determined based on LRU bits in a corresponding entry in the LRU table 118.

Returning to step 250, in one embodiment of the invention, if all of the HL bits within the congruence class are not set, then the address translation logic 114 may proceed to step 258 where operations may be performed to determine if the LRU way, determined from checking the LRU table 118, within the congruence class has its hint lock bit set. If so, the address translation logic 114 may proceed to step 260 where the LRU formation logic 120 may calculate a non-hint locked LRU way. Exemplary calculations of a non-hint locked LRU way are described below with reference to FIGS. 3B & 3C. Once the LRU formation logic has calculated a non-hint locked LRU way, the LRU formation logic may set the replacement way to the non-hint locked LRU way at step 264. After the replacement way has been set, at step 240 the address translation logic 114 may replace the selected entry with the data fetched in response to the miss.

Returning to step 258, if the address translation logic 114 determines that the cache entry at the new LRU way does not have its hint lock bit set, then the address translation logic proceeds to step 264 where the replacement way is set to the LRU way. Next, at step 240, the address translation logic 114 will replaced the selected entry with the data fetched from main memory.

Exemplary LRU Calculations

In one embodiment, the calculation of a new LRU way is based on an assumption that picking the new LRU way will be best made if a determination is made based on what way within the congruence class caused a cache hit on the most recent address translation request. This assumption is based on the theory that if you don't pick the most recently used cache entry when calculating the LRU, there is a higher probability the true LRU way within the congruence class will be calculated.

In one embodiment, the binary tree pseudo LRU algorithm is the base algorithm for picking the LRU way. A binary tree pseudo LRU algorithm (a binary tree for short) is a two dimensional tree algorithm used to pick a LRU. When the binary tree pseudo algorithm is used with a 4-way set associative cache, three bits are needed to determine the LRU (herein referred to as the LRU bits: LRU_bit(0), LRU_bit(1), and LRU_bit(2)). The binary tree pseudo algorithm operates on two basic rules: if the LRU bit value is a zero, proceed to the left down the binary tree, if the LRU bit value is a one, proceed to the right down the binary tree. The binary tree pseudo algorithm may be best explained with reference to the examples shown in FIGS. 3A-3C.

FIG. 3A contains exemplary LRU and replacement way calculations, and binary tree structures illustrating the LRU way when there are no ways within a congruence class that have their hint lock bit set (i.e., no hint locked ways). As illustrated under the binary tree column 306 in the first row 338 of FIG. 3A, an initial state of the LRU bits for this example as all zeros. A binary tree structure as is commonly known by those skilled in the art.

The triangular formation of the binary tree structure using the LRU bits is as follows: LRU_bit(0) is at the top of the binary tree, LRU_bit(1) is on the second row on the left side of the binary tree, and LRU_bit(2) is on the second row on the right side of the binary tree. The third row of the binary tree is a representation of the different ways or entries within the congruence class. The ways, or entries, are in increasing order, from left to right, with way zero on the left and way three on the right.

Address translation logic 114 may determine the LRU way using the binary tree structure. As indicated previously, the initial setting of the LRU, all of the LRU bits are set to zero. The LRU initial setting may be determined by accessing the LRU table 118. Starting at the top of the binary tree structure, and using the two basic rules of the binary tree pseudo LRU algorithm, the address translation logic 114 may determine the LRU way. As illustrated, LRU_bit(0) is a zero so the address translation logic 114 now proceeds left down the binary tree structure, as indicated by the bold arrow, to check the value of LRU_bit(1). The value of LRU_bit(1) is also a zero so the address translation logic 114 proceeds left down the binary tree structure, as indicated by the bold arrow, to way zero (way(0)). Way zero is the replacement way based on an initial LRU of 000.

In one embodiment of the invention, as seen in step 220 of FIG. 2B, LRU table entries are modified after there has been a cache hit. Based on which way within the congruence class was hit on an address translation request, predefined LRU set bits and LRU mask bits may be chosen. The LRU set bits and LRU mask bits may be used to modify the LRU to form a new LRU, as will be described in detail with reference to examples shown in FIGS. 3A-3C. The LRU mask bits and the LRU set bits used for one exemplary embodiment of the invention are set forth in Table 1 below.

TABLE 1

| LRU Set Bits | |
| --- | --- |
| Hit way = 0 | LRU Set Bits = 110 |
| Hit way = 1 | LRU Set Bits = 100 |
| Hit way = 2 | LRU Set Bits = 001 |
| Hit way = 3 | LRU Set Bits = 000 |
| LRU Mask Bits | |
| Hit way = 0 | LRU Mask Bits = 110 |
| Hit way = 1 | LRU Mask Bits = 110 |
| Hit way = 2 | LRU Mask Bits = 101 |
| Hit way = 3 | LRU Mask Bits = 101 |

In one embodiment of the invention, if an address translation request was received by the address translation logic 114 that caused a cache hit on way two within the congruence class, the LRU (corresponding LRU bits in the LRU table) may be modified. This example is illustrated in row two 312 of FIG. 3A. Using Table 1 above, a hit on way two would mean that the LRU set bits and the LRU mask bits used to modify the LRU would be 001 and 101 respectively. As illustrated in the calculate LRU column 304, the old LRU bits taken from the LRU table 118 may be 000.

A zero mask bit value indicates that the new LRU value for that respective bit location should not change from the old LRU to the new LRU. A one mask bit value indicates that the new LRU value for that respective bit location should change to the set bit value for that respective location from the old LRU to the new LRU.

As illustrated in row two under the calculate LRU column 304, the mask bits and the set bits from Table 1 are used to modify the old LRU (000) to a new LRU (001). Placing the new LRU bits into the binary tree structure, the address translation logic 114 may determine which way within the congruence class the new LRU points. In other words, after this cache hit, the LRU table may be updated with this new calculated value.

With a zero in the first bit location the address translation logic 114 may proceed left to LRU bit one location. At LRU bit one location there is another zero, so the address translation logic may proceed left down the binary tree structure to way zero (way(0)) when the next miss occurs in the same congruence class.

Row three 314, illustrates an example of updating the LRU after there has been a hit on way 1 of the congruence class. Based on the old LRU value, 001 (calculated after there was a hit on way 2 and illustrated in row two 312) and the set and mask bit values from Table 1 corresponding to a hit on way one, 100 and 110 respectively, the calculated new LRU value is 101. The address translation logic 114 may now use the new LRU value to determine the LRU replacement way. As illustrated in the binary tree column 306 of row three 314, a new LRU value of 101 will lead the address translation logic 114 to way three of the congruence class. Thus, based on a new LRU value of 101, way three will be replaced with new data on a cache miss.

Row four 316, illustrates an example of updating the LRU after there has been a hit on way three of the congruence class. Based on the old LRU value, 101, calculated when there was a hit on way one and illustrated in row three 314, and the set and mask bit values from Table 1 corresponding to a hit on way three, 000 and 101 respectively, the new LRU value is 000. The address translation logic 114 may now use the new LRU value to determine the LRU replacement way. As illustrated in the binary tree column 306 of row four 316, a new LRU value of 000 will lead the address translation logic 114 to way zero of the congruence class. Thus, based on a new LRU value of 000, way zero will be replaced with new data on a cache miss.

Row five 318, illustrates an example of updating the LRU after there has been a hit on way zero of the congruence class. Based on the old LRU value, 000, calculated when there was a hit on way three and illustrated in row four 316, and the set and mask bit values from Table 1 corresponding to a hit on way zero, 110 and 110 respectively, the new LRU value is 110. The address translation logic 114 may now use the new LRU value to determine the LRU replacement way. As illustrated in the binary tree column 306 of row five 318, a new LRU value of 110 will lead the address translation logic 114 to way two of the congruence class. Thus, based on a new LRU value of 110, way two will be replaced with new data if there is a cache miss.

Row six 320, illustrates an example of updating the LRU after there has been a hit on way two of the congruence class. Based on the old LRU value, 110, calculated when there was a hit on way zero and illustrated in row five 318, and the set and mask bit values from Table 1 corresponding to a hit on way two, 001 and 101 respectively, the new LRU value is 011. The address translation logic 114 may now use the new LRU value to determine the LRU replacement way. As illustrated in the binary tree column 306 of row six 320, a new LRU value of 011 will lead the address translation logic 114 to way one of the congruence class. Thus, based on a new LRU value of 011, way one will be replaced with new data if there is a cache miss. It should be noted how the order of hits and, thus existing LRU value, affects the outcome of the calculated LRU value. In the previous hit on way 2 (row 312), with an existing/previous LRU value of 000, the new value was 001.

FIG. 3B illustrates the calculation of a new LRU way when there is one hint locked way within a congruence class (i.e., one way within the congruence class has its hint lock bit set) and software address translation cache miss handling is enabled, according to one embodiment of the invention. Under the binary tree column 334 in the first row 338 of FIG. 3B, the LRU bits are illustrated as all zeros and the hint locked way (way 2) is also illustrated.

The operations pertaining to modification of the LRU to generate a new LRU are part of address translation logic 114 operations described earlier in step 220 of FIG. 2B. In this example, the initial LRU bits are 000 and may be read from the LRU table 118. In one embodiment of the invention, if an address translation request was received by the address translation logic 114 that caused a cache hit on way two within the congruence class, the LRU will not be modified when software address translation cache miss handling is enabled. This example is illustrated in row two 340 of FIG. 3B. The LRU will not be modified because a hit on a hint locked way occurred (hit on way two) and software address translation cache miss handing was enabled. Thus, the LRU will remain 000, which through the use of the binary tree structure indicates way zero as the replacement way. If there is a need to replace data within this congruence class due to a miss, way zero will be the replacement way within the cache. This is a further illustration of the address translation logic 114 operations described earlier in steps 226 and 228 of FIG. 2B.

As shown in row 342, after the LRU was not modified because of a hit on a hint locked way when software address translation cache miss handling was enabled, an address translation request may be received by the address translation logic 114 that caused a cache hit on way one within the congruence class. Even though software address translation cache miss handling is enabled, since the hit was not on a hint locked way, the LRU may be modified. This example is illustrated in row three 342 of FIG. 3B. As illustrated in the calculate LRU column 332, the LRU bits from the LRU table 118, are still the initial 000, because the hit on a hint locked way in row 340 did not modify them as described above.

Based on the old LRU value, 000, and the set and mask bit values from Table 1 corresponding to a hit on way one, 100 and 110 respectively, the new LRU value is 100. The address translation logic 114 may now use the new LRU value to determine the LRU replacement way for the next cache miss in this congruence class. A new LRU value of 100 would lead the address translation logic 114 down the binary tree to way two of the congruence class.

This presents a problem, because way 2 of the congruence class is a hint locked way. Either software address translation cache miss handling or hardware address translation cache miss handling enabled the hint lock bit of the way 2 entry of the congruence class in the address translation cache 112. A hint locked way should not be replaced with new data fetched from main memory after a cache miss. Thus, as described above in FIG. 2C step 260, in one embodiment of the invention, the LRU formation logic 120 may now alter the LRU to point to a non-hint locked LRU way.

LRU formation logic 120 designed to modify the new LRU to a non-hint locked LRU way is illustrated and further described with reference to FIG. 4. The LRU formation logic may use the new LRU, 100, and the hint lock bits of the congruence class, to modify the new LRU to a non-hint locked LRU. The result of the LRU formation logic modification of new LRU 100, is non-hint locked LRU 101 as illustrated in FIG. 3B at the intersection of row three 342 and the calculate LRU column 332.

In FIG. 3B at the intersection of row three 342 and the binary tree column 334, the binary tree for the non-hint locked LRU 101 is illustrated. The non-hint locked LRU 101 will lead the address translation logic 114 down the binary tree to way three of the congruence class on the next cache miss in this congruence class. Thus, after a cache miss data fetched from main memory may be placed in way three of the congruence class.

Row four 344 of FIG. 3B, illustrates an example of updating the LRU after there has been a hit on way three of the congruence class. Based on the old LRU value, 101, calculated when there was a hit on way one and illustrated in row three 342 of FIG. 3B, and the set and mask bit values from Table 1 corresponding to a hit on way three, 000 and 101 respectively, the new LRU value is 000. The address translation logic 114 may now use the new LRU value to determine the LRU replacement way on the next cache miss in this congruence class. As illustrated in the binary tree column 334 of row four 344, a new LRU value of 000 will lead the address translation logic 114 to way zero of the congruence class. Thus, based on a new LRU value of 000, way zero may be replaced with new data if there is a cache miss in this congruence class.

Row five 346 of FIG. 3B, illustrates an example of updating the LRU after there has been a hit on way zero of the congruence class. Based on the old LRU value, 000, calculated when there was a hit on way three and illustrated in row four 344 of FIG. 3B, and the set and mask bit values from Table 1 corresponding to a hit on way zero, 110 and 110 respectively, the new LRU value is 110. The address translation logic 114 may now use the new LRU value to determine the LRU replacement way on the next cache miss in this congruence class. A new LRU value of 110 would lead the address translation logic 114 down the binary tree to way two of the congruence class.

This presents a problem, because way two of the congruence class is a hint locked way. Either software address translation cache miss handling or hardware address translation cache miss handling enabled the hint lock bit of the way two entry of the congruence class in the address translation cache 112. A hint locked way should not be replaced with new data fetched from main memory after a cache miss. Thus, as described above in FIG. 2C step 260, the LRU formation logic 120 may now alter the LRU to point to a non-hint locked LRU way.

LRU formation logic 120 designed to modify the new LRU to a non-hint locked LRU way is illustrated and further described with reference to FIG. 4. The LRU formation logic may use the new LRU, 110, and the hint lock bits of the congruence class to modify the new LRU to a non-hint locked LRU. The result of the LRU formation logic modification of new LRU 110, is non-hint locked LRU 111 as illustrated in FIG. 3B at the intersection of row five 346 and the calculate LRU column 332.

In FIG. 3B at the intersection of row five 346 and the binary tree column 334, the binary tree for the non-hint locked LRU 111 is illustrated. The non-hint locked LRU 111 will lead the address translation logic 114 down the binary tree to way three of the congruence class. Thus, after a cache miss data fetched from main memory may be placed in the address translation cache at way three on the next cache miss in this congruence class.

Row six 348 of FIG. 3B, illustrates an example of updating the LRU after there has been a hit on way two of the congruence class. In one embodiment of the invention, if an address translation request was received by the address translation logic 114 that caused a cache hit on way two within the congruence class, the LRU will not be modified. This example is illustrated in row six 348 of FIG. 3B. The LRU will not be modified because a hit on a hint locked way occurred (hit on way two) and software address translation cache miss handing is enabled. Thus, the LRU will remain 111, which through the use of the binary tree structure indicates way three as the replacement way. If there is a need to replace data within the cache due to a miss in this congruence class, way three will be the replacement way within the cache. This is a further illustration of the address translation logic 114 operations described earlier in steps 226 and 228 of FIG. 2B.

FIG. 3C illustrates the calculation of a new LRU way when there are two hint locked ways within a congruence class (i.e., two ways within the congruence class have their hint lock bits set) and software address translation cache miss handling is disabled. Under the binary tree column 364 in the first row 368 of FIG. 3C, an initial setting of the LRU bits are illustrated as all zeros and the hint locked ways (way two & way three) are also illustrated.

Row two 370 of FIG. 3C illustrates an example of updating the LRU after there has been a hit on way two of the congruence class. In one embodiment of the invention, if an address translation request was received by the address translation logic 114 that caused a cache hit on way two within the congruence class, the LRU will be modified. Based on the initial LRU value, 000, illustrated in row one 368, and the set and mask bit values from Table 1 corresponding to a hit on way two, 001 and 101 respectively, the new LRU value is 001. The address translation logic 114 may now use the new LRU value to determine the LRU replacement way. As illustrated in the binary tree column 364 of row two 370, a new LRU value of 001 will lead the address translation logic 114 to way zero of the congruence class. Thus, based on a new LRU value of 001, way zero will be replaced with new data on a cache miss in this congruence class.

Row three 372, illustrates an example of updating the LRU after there has been a hit on way one of the congruence class. Based on the old LRU value, 001, calculated when there was a hit on way two and illustrated in row two 370, and the set and mask bit values from Table 1 corresponding to a hit on way one, 100 and 110 respectively, the new LRU value is 101. The address translation logic 114 may now use the new LRU value to determine the LRU replacement way on the next cache miss in this congruence class. A new LRU value of 101 would lead the address translation logic 114 down the binary tree to way three of the congruence class.

This presents a problem, because way three of the congruence class is a hint locked way. Either software address translation cache miss handling or hardware address translation cache miss handling enabled the hint lock bit of the way three entry of the congruence class in the address translation cache 112. A hint locked way should not be replaced with new data fetched from main memory after a cache miss. Thus, as described above in FIG. 2C step 260, in one embodiment of the invention, the LRU formation logic 120 may now alter the LRU to point to a non-hint locked LRU way.

LRU formation logic 120 designed to modify the new LRU to a non-hint locked LRU way is illustrated and further described with reference to FIG. 4. The LRU formation logic may use the new LRU, 101, and the hint lock bits of the congruence class to modify the new LRU to a non-hint locked LRU. The result of the LRU formation logic modification of new LRU 101, is non-hint locked LRU 001 as illustrated in FIG. 3C at the intersection of row three 372 and the calculate LRU column 362.

In FIG. 3C at the intersection of row three 372 and the binary tree column 364, the binary tree for the non-hint locked LRU 001 is illustrated. The non-hint locked LRU 001 will lead the address translation logic 114 down the binary tree to way zero of the congruence class. Thus, after a cache miss in this congruence class data fetched from main memory may be placed in way zero of the congruence class.

Row four 374 of FIG. 3C illustrates an example of updating the LRU after there has been a hit on way three of the congruence class. In one embodiment of the invention, if an address translation request was received by the address translation logic 114 that caused a cache hit on way three within the congruence class, the LRU may be modified. Based on the previous LRU value, 001, illustrated in row three 372, and the set and mask bit values from Table 1 corresponding to a hit on way three, 000 and 101 respectively, the new LRU value is 000. The address translation logic 114 may now use the new LRU value to determine the LRU replacement way. As illustrated in the binary tree column 364 of row four 374, a new LRU value of 000 will lead the address translation logic 114 to way zero of the congruence class. Thus, based on a new LRU value of 000, way zero will be replaced with new data on a cache miss in this congruence class.

Row five 376, illustrates an example of updating the LRU after there has been a hit on way zero of the congruence class. Based on the old LRU value, 000, calculated when there was a hit on way three and illustrated in row four 374, and the set and mask bit values from Table 1 corresponding to a hit on way zero, 110 and 110 respectively, the new LRU value is 110. The address translation logic 114 may now use the new LRU value to determine the LRU replacement way. A new LRU value of 110 would lead the address translation logic 114 down the binary tree to way two of the congruence class. This presents a problem, because way two of the congruence class is a hint locked way. Either software address translation cache miss handling or hardware address translation cache miss handling enabled the hint lock bit of the way three entry of the congruence class in the address translation cache 112. A hint locked way should not be replaced with new data fetched from main memory after a cache miss. Thus, as described above in FIG. 2C step 260, in one embodiment of the invention, the LRU formation logic 120 may now alter the LRU to point to a non-hint locked LRU way.

LRU formation logic 120 designed to modify the new LRU to a non-hint locked LRU way is illustrated and further described with reference to FIG. 4. The LRU formation logic may use the new LRU, 110, and the hint locked bits of the congruence class to modify the new LRU to a non-hint locked LRU. The result of the LRU formation logic modification of new LRU 110, is non-hint locked LRU 010 as illustrated in FIG. 3C at the intersection of row five 376 and the calculate LRU column 362.

In FIG. 3C at the intersection of row five 376 and the binary tree column 364, the binary tree for the non-hint locked LRU 001 is illustrated. The non-hint locked LRU 010 will lead the address translation logic 114 down the binary tree to way one of the congruence class. Thus after a cache miss in this congruence class data fetched from main memory may be placed in way one of the congruence class.

Row six 378 of FIG. 3C illustrates an example of updating the LRU when there has been a hit on way two of the congruence class. In one embodiment of the invention, if an address translation request was received by the address translation logic 114 that caused a cache hit on way two within the congruence class, the LRU will be modified. Based LRU value, 010, illustrated in row five 376, and the set and mask bit values from Table 1 corresponding to a hit on way two, 001 and 101 respectively, the new LRU value is 011. The address translation logic 114 may now use the new LRU value to determine the LRU replacement way on the next cache miss in this congruence class. As illustrated in the binary tree column 364 of row six 378, a new LRU value of 011 will lead the address translation logic 114 to way one of the congruence class. Thus, based on a new LRU value of 011, way one will be replaced with new data on a cache miss in this congruence class.

Exemplary Non-Hint Locked LRU Selection Logic

Figure 4:
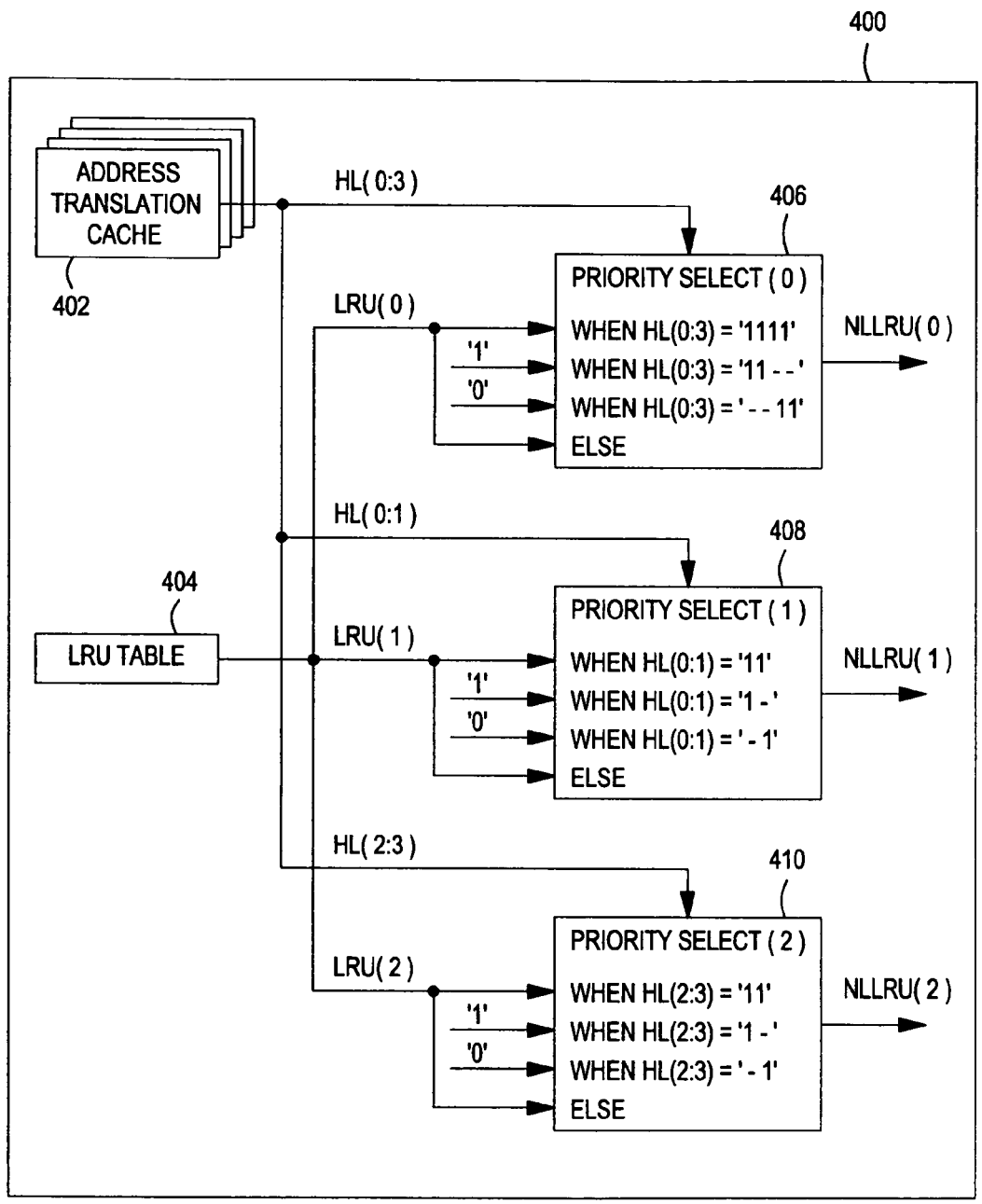
FIG. 4 is a block diagram illustrating logic designed to pick an address translation memory cache replacement way, according to one embodiment of the invention.

FIG. 4 is a block diagram of selection logic 400 configured to modify an LRU value from the LRU table, in an effort to avoid selecting hint locked ways, according to one embodiment of the invention. The selection logic 400 in FIG. 4 may be part of the LRU formation logic 120 illustrated in FIG. 1. The selection logic 400 present in FIG. 4 may be used to modify LRU bits to generate "non-hint locked" LRU bits (NLLRU) to be used to traverse a binary tree (as shown in FIGS. 3B and 3C) in a manner that avoids hint locked ways.

The selection logic 400 may include a set of priority select logic blocks 406, 408, and 410 configured to generate NLLRU(0), NLLRU(1), and NLLRU(2), respectively, by modifying LRU bits read from the LRU table 404 based on hint lock bits. As illustrated, if all hint lock bits are set or anything other than a predetermined set of bit values, each priority select logic block merely passes the corresponding LRU bit read from the table unmodified. Else, if the hint lock bits are set to a predetermined value for any give priority select logic block, the corresponding LRU bit may be modified to generate the corresponding NLLRU bit.

As an example, referring first to priority select logic 406, if not all of the hint lock bits are set, but the higher order two bits are set (e.g., HL(0:3)='11--' where the bit values at locations specified by '-' do not effect the determination), a one is generated for NLLRU(0) regardless of the value for LRU(0). On the other hand, if the lower two bits are set (e.g., HL(0:3) ='--11 '), a zero is generated for NLLRU(0) regardless of the value for LRU(0). Referring back to the binary tree logic shown in FIG. 3C, it can be seen that forcing NLLRU(0) to zero forces a path down the left side of the binary tree, thereby avoiding hint locked ways 2 and 3.

Priority select logic blocks 408 and 410 may operate in a similar manner to avoid hint locked ways by controlling paths from the second level of the binary tree via NLLRU(1) and NLLRU(2). Referring first to priority select logic block 408, if way 0 is hint locked, but way 1 is not, NLLRU(1) may be set to a one, guiding the path down the corresponding binary tree node (second level) to the right (way 1). If way 1 is hint locked, but way 0 is not, NLLRU(1) may be set to a zero, guiding the path down the corresponding binary tree node to the left (way 0).

Referring lastly to priority select logic block 410, if way 2 is hint locked, but way 3 is not, NLLRU(2) may be set to a one, guiding the path down the corresponding binary tree node (second level) to the right (way 3). If way 3 is hint locked, but way 2 is not, NLLRU(2) may be set to a zero, guiding the path down the corresponding binary tree node to the left (way 2).

CONCLUSION

By modifying an LRU algorithm, an improved technique for calculating a replacement way within an address translation memory cache is achieved. For some embodiments, LRU table entries may be updated on cache hits, but not if a hit is on a hint locked way and software address translation cache miss handling is enabled. For some embodiments, LRU table entries may be modified to account to select a way for replacement that takes into account hint locked ways.

While the foregoing is directed to embodiments of the present invention, other and further embodiments of the invention may be devised without departing from the basic scope thereof, and the scope thereof is determined by the claims that follow.

What is claimed is:

1. A method of updating entries in a table used to indicate recent use of entries in an address translation cache in order to guide replacement, comprising:
   detecting that a request for address translation hits in the address translation cache;
   determining if the request for address translation hit on a hint locked entry of the address translation cache; and
   updating an entry in the table only if software address translation cache miss handling is disabled.

2. The method of claim 1, wherein:
   the address translation cache is a set associative cache with each set having multiple ways or a fully associative cache with each set having multiple ways.

3. The method of claim 1, wherein determining if the request for address translation hit on a hint locked way comprises checking one or more hint lock bits.

4. The method of claim 1, wherein the entry in the table is updated only if the request for address translation hit on an entry that is not hint locked.

5. A processor, comprising:
   an address translation cache;
   a table holding entries indicating the recent use of entries in the address translation cache; and
   logic configured to detect that a request for address translation hits in the address translation cache, determine if the request for address translation hit on a hint locked entry of the address translation cache, and update entries in the table only if software address translation cache miss handling is disabled.

6. The processor or claim 5, wherein the logic is further configured to:
   fetch data in response to an address translation request that misses in the address translation cache;
   retrieve an entry from the table;
   generate a selection value by modifying the retrieved entry based on corresponding hint lock bits; and
   use the generated selection value to select a way in the address translation cache for replacement with the fetched data.

7. The processor of claim 6, wherein the logic is further configured to:
   retrieve an entry from the table and ignore the hint lock bits if all the hint lock bits indicate all the ways are hint locked and select a way for replacement based on an entry from the table.

8. The processor of claim 6, wherein:
   the address translation cache is a set associative cache, with each set having multiple ways or a fully associative cache; and
   the logic is configured to determine if the request for address translation hits on a hint locked way.

9. The processor of claim 6, wherein the logic is configured to determine if the request for address translation hit on a hint locked way by checking one or more hint lock bits.

10. The processor of claim 5, wherein the logic is configured to update entries in the table only if the address translation cache hits on an entry that is not hint locked.

* * * * *